Figure 1:
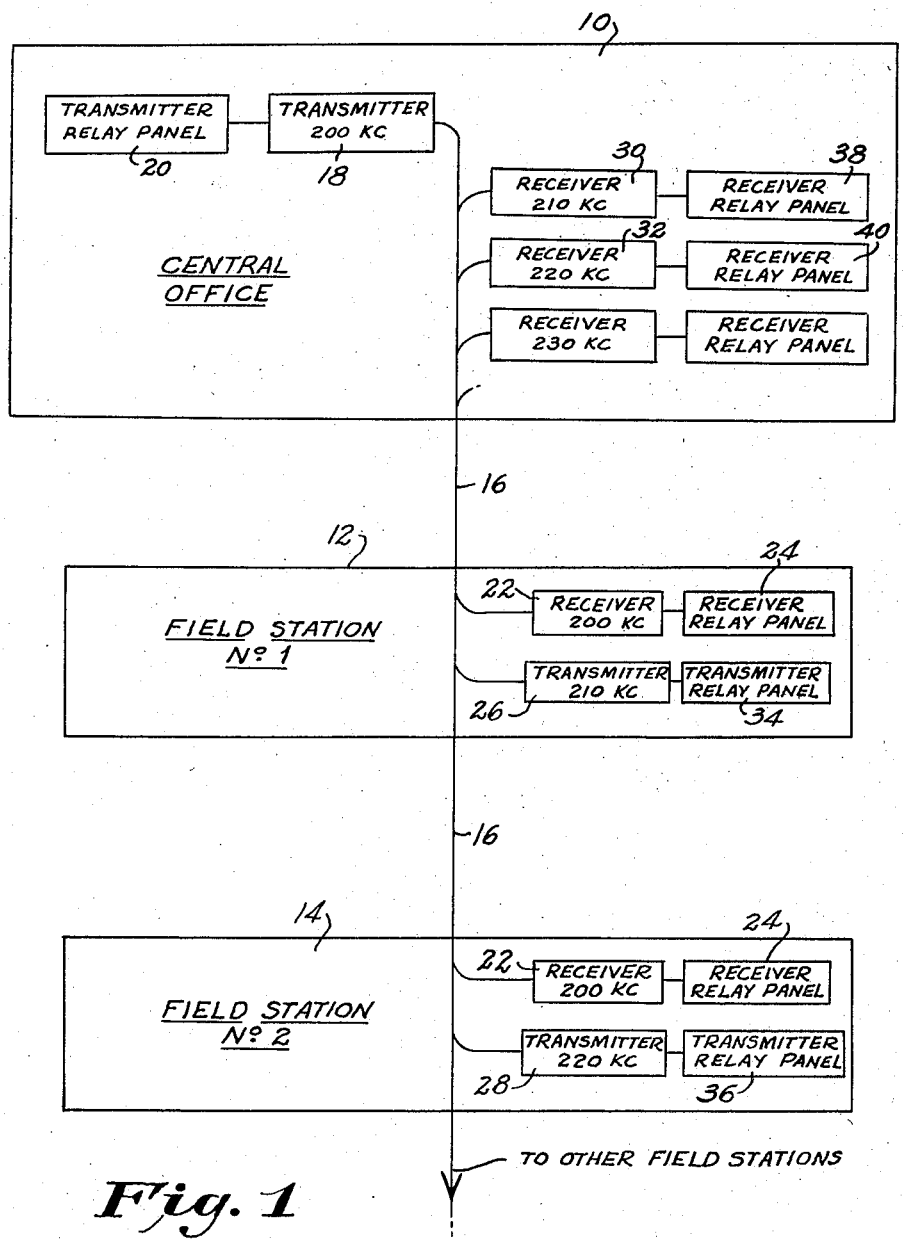

April 21, 1959     C. M. LEEDS ET AL     2,883,647
SUPERVISORY REMOTE CONTROL AND SIGNALLING SYSTEM
Filed Nov. 15, 1952

INVENTORS:
Charles M. Leeds, Henry B. Hoff,
William M. Pelino & John Johannesen, BY Oberlin & Limbach
ATTORNEYS United States Patent Office 2,883,647
Patented Apr. 21, 1959

2,883,647
SUPERVISORY REMOTE CONTROL AND SIGNALLING SYSTEM

Charles Murray Leeds, Natick, Mass., and Henry B. Hoff, Parma, and William M. Pelino, Mayfield Heights, Ohio, and John Johannesen, Morris Plains, N.J., assignors to Servo Electronic Switch and Signal Company, a corporation of Ohio Application November 15, 1952, Serial No. 320,702

10 Claims. (Cl. 340—163)

This invention pertains to remote control and signalling systems, and particularly to such systems in which a central control office is connected to a plurality of relatively remote field stations by a single line or channel over which pass impulses of current or wave energy to accomplish both the selection of a desired field station and the control or operation of equipment at the selected field station.

It is a principal object of the invention to provide a system and apparatus of the above type which are relatively simple and inexpensive, as compared with prior equipments capable of the same functions. The invention will be disclosed herein in connection with its application to railroad operations, in which the central office selects a remote field station and then controls the operation of equipment such as track switches, semaphores or the like at that field station, but it will be understood that the system and apparatus as disclosed can equally well be adapted for other signalling and controlling applications.

A further important object of the invention is to provide a system of the above type which utilizes, almost entirely, relatively simple and conventional electric switches and relays as its components, and which will be relatively trouble-free in use and inexpensive to construct and operate. A subsidiary object of the invention is to provide such an arrangement in which the units of apparatus at the control office and at each field station are built up of elements of similar or identical kind, whereby a minimum number of types of replacement parts need be carried in stock for servicing operations, and whereby the initial cost of an installation is reduced.

Another object of the invention is to provide a system of this type in which a single series of control impulses issued from the control office or location accomplishes both field station selection and selection of a function or control to be exercised at or near the selected field station. As compared with systems in which separate apparatus units are utilized for these two kinds of operations, the present arrangement provides increased simplicity and security of operation, and also results in increased speeds of operation, whereby multiple field stations may be controlled without inefficient and often dangerous delays.

Still another object of the invention is to provide a system of this kind in which the pulses of current or wave energy making up any one series of pulses from the control office to the field stations are all obtained from the same apparatus at the control office, with consequent savings of equipment as compared with systems in which separate transmitter equipments are required for the control of respective remote field stations.

A further object of the invention is to provide a system of the above type in which answer-back facilities are incorporated, whereby the condition of equipment at respective individual field stations is reported back to the control office, for verification of the correctness with which the desired functions have been accomplished.

Yet another object of the invention is to provide an improved remote control and answer-back signalling system in which answer-back operation is obtained not only upon the completion of any change in the controlled equipment incident to initiation of central office control action, but in which automatic supervisory answer-back operation is initiated whenever a change in the controlled condition of any remote piece of equipment results from any cause; for example, from accidental or malicious alteration in the condition of such equipment.

A further object of the invention is to provide a system of the above type in which the individual pulses of any series thereof, corresponding to one cycle of station selection and function control, are all of the same amplitude, and in which the individual pulses are distinguished by alteration of some other characteristic thereof, notably by the relative time durations of the "marking" and "spacing" portions of each pulse. An ancillary object of the invention, in this connection, is the provision of improved means for varying or altering the duration of the marking or spacing portions of individual pulses.

An additional object of the invention is to provide a system of this type in which a maximum portion of all of the apparatus required at both the central control office and at the field stations is common equipment; that is, is equipment which is shared among distinct and different stations and functions. The achievement of this aim greatly reduces the size and complexity of all units of the apparatus, and makes the extension of the system to additional field stations, and/or additional control functions, relatively easy and inexpensive.

Figure 2:
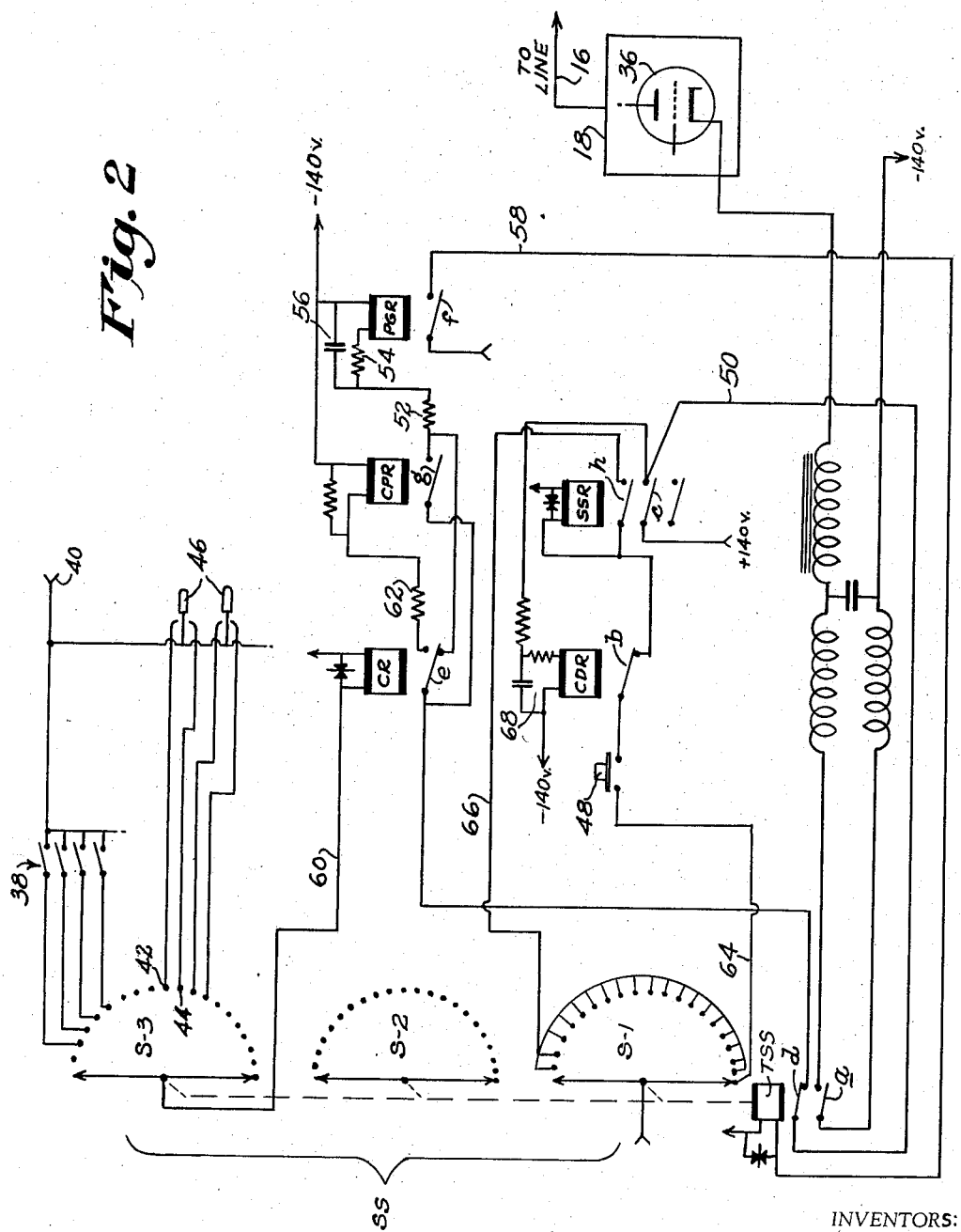
Figure 3:
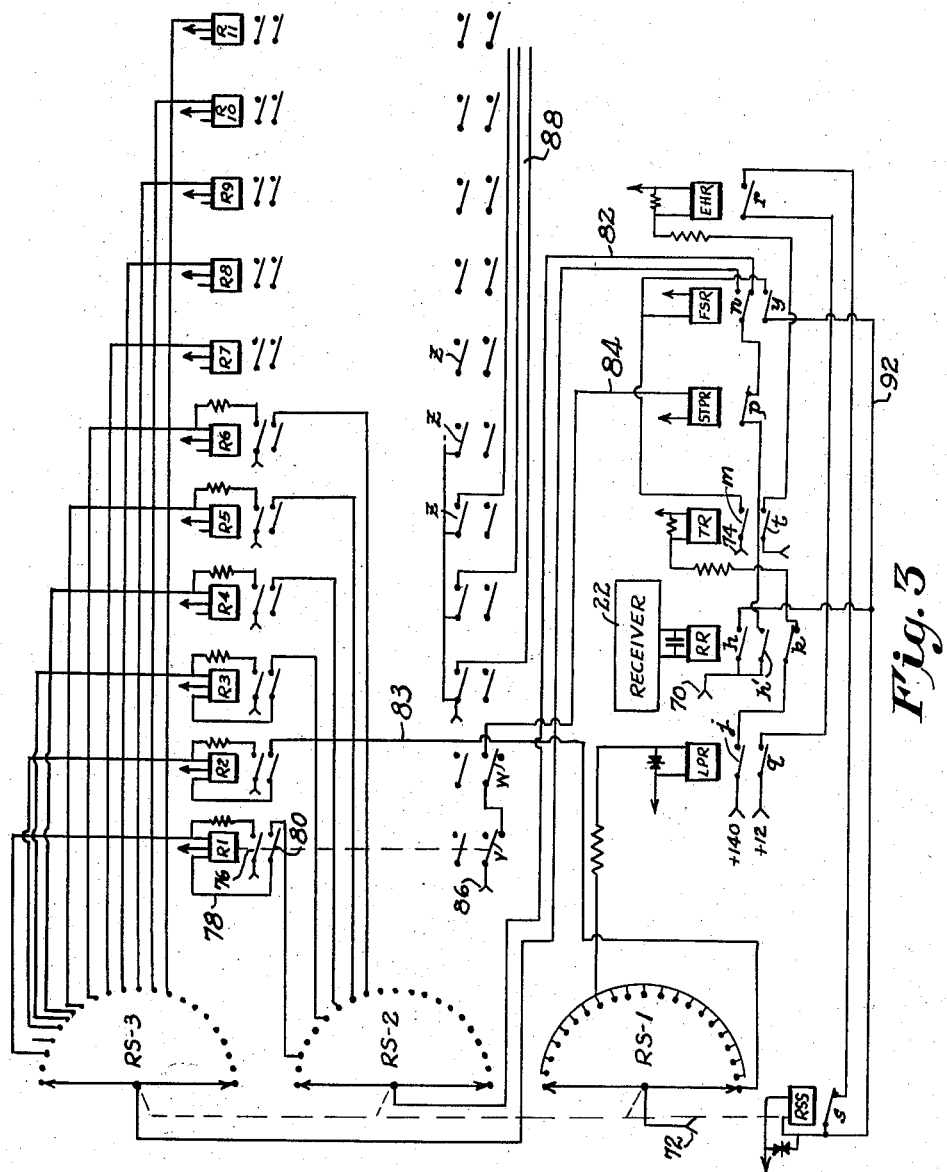

The above and other objects and advantages of the system of the present invention will best be understood by referring to the following detailed specification of a preferred and exemplary embodiment thereof, and to the accompanying drawings, in which:

Fig. 1 is a block diagram of essential portions of a complete control and answer-back signalling system in accordance with the invention, Fig. 2 is a schematic diagram of the equipment making up the transmitter relay panel of the central control office, shown as connected to a signal transmitter which is itself indicated by a block diagram, Fig. 3 is a schematic view, similar to Fig. 2 of the equipment making up a receiver relay panel at one of the remote field stations, together with a block showing of the signal receiver itself and of an exemplary form of apparatus ultimately controlled by this receiver relay panel.

Figure 4:
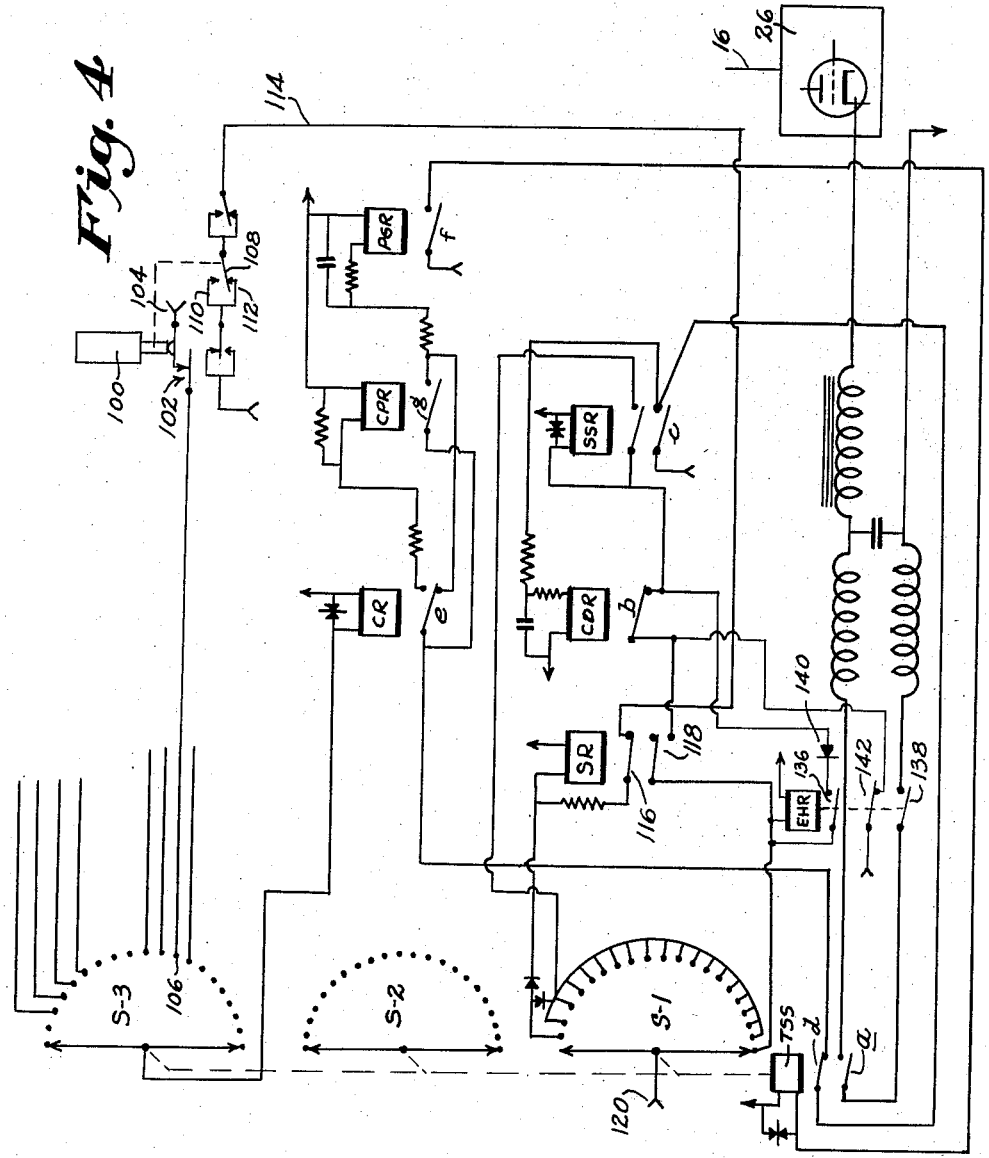
Figure 5:
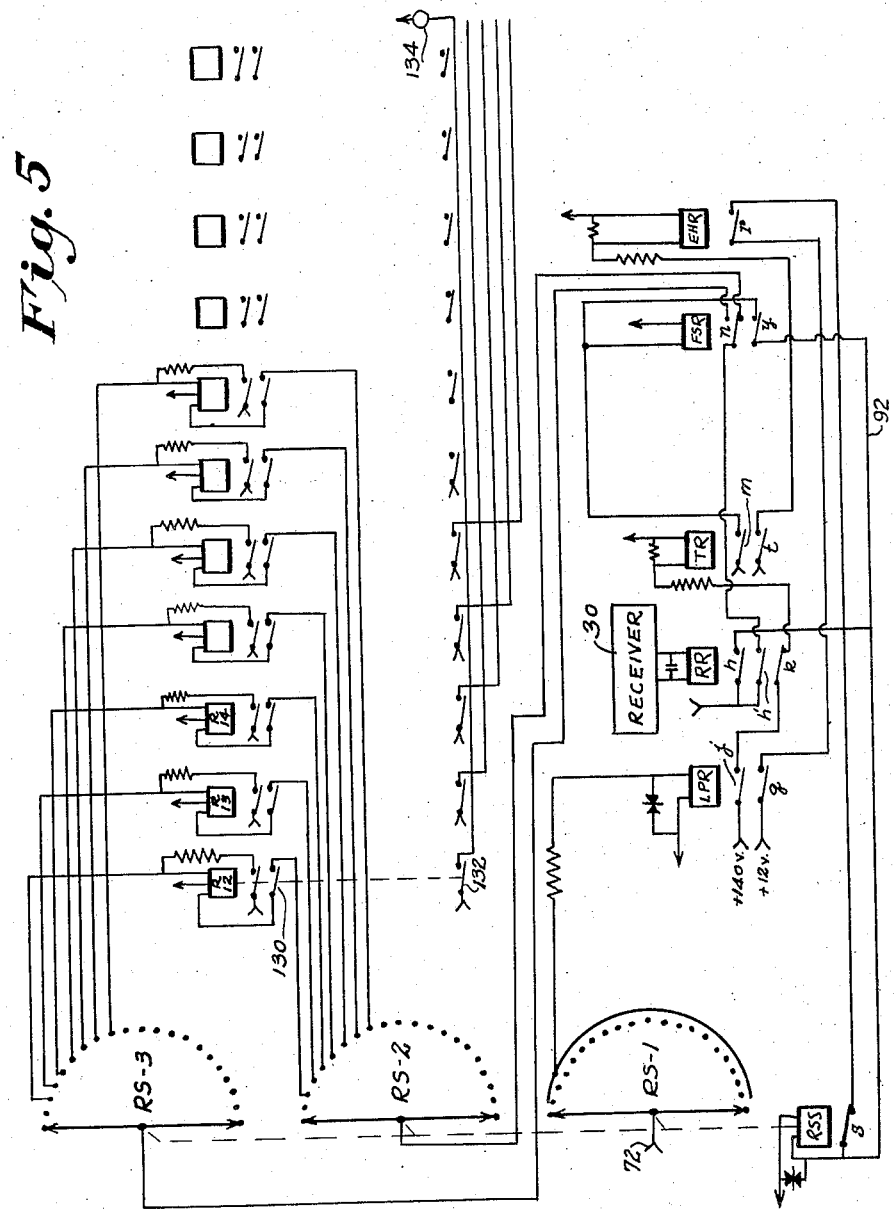
Figure 6:
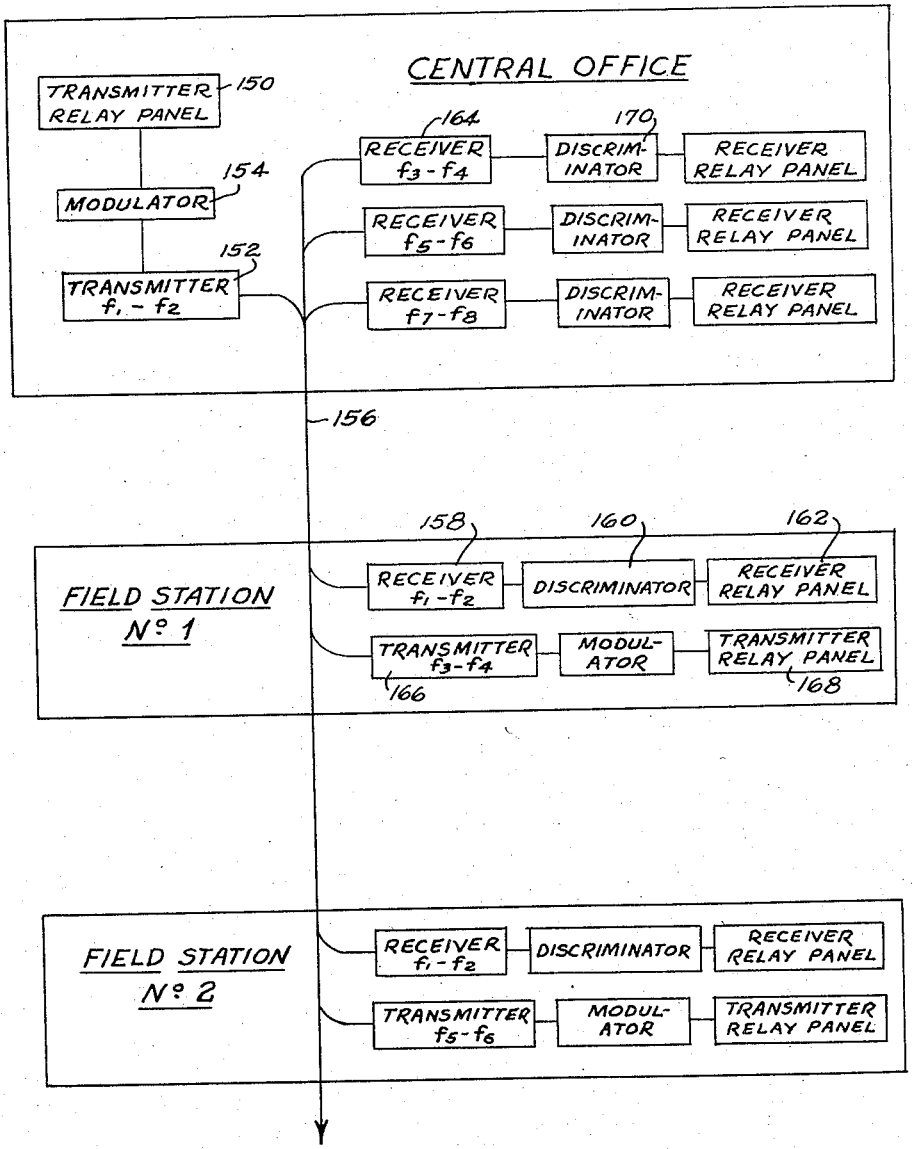
Figure 7:
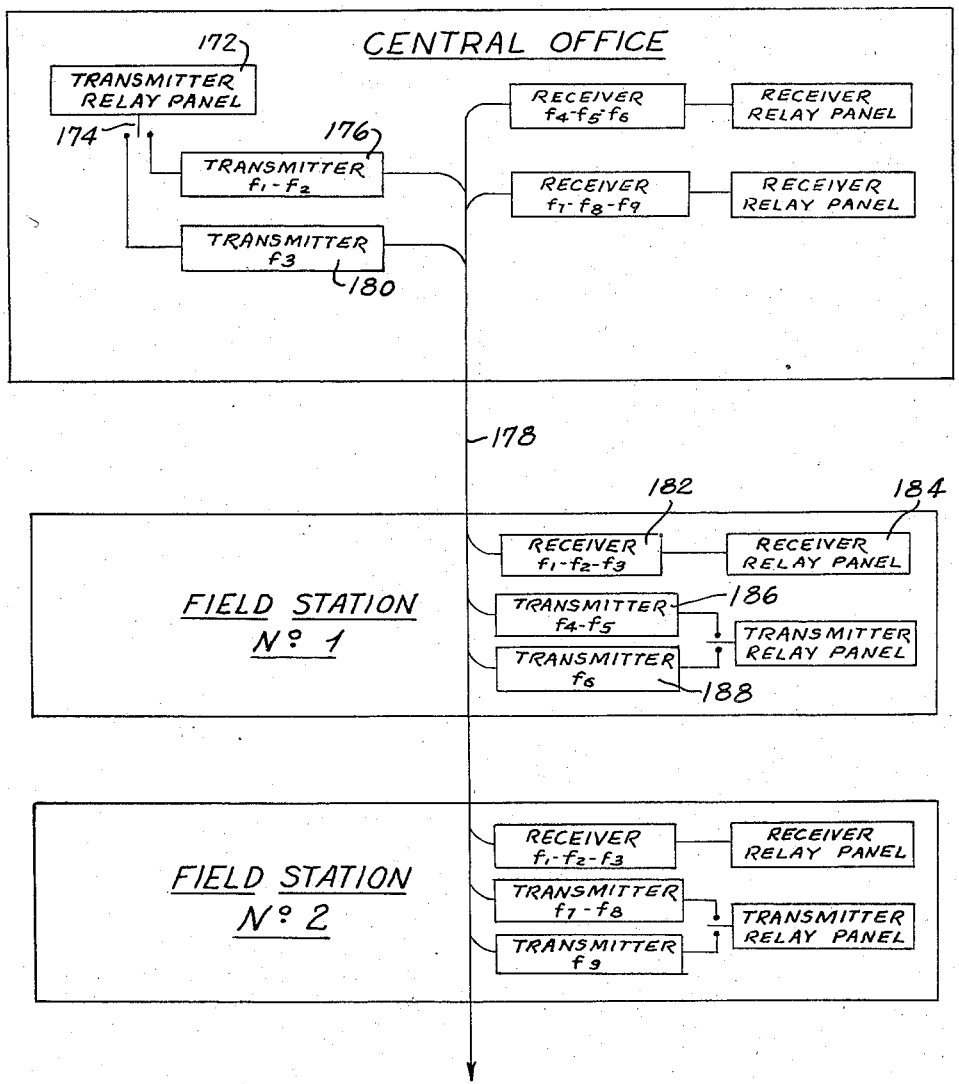
Figure 8:
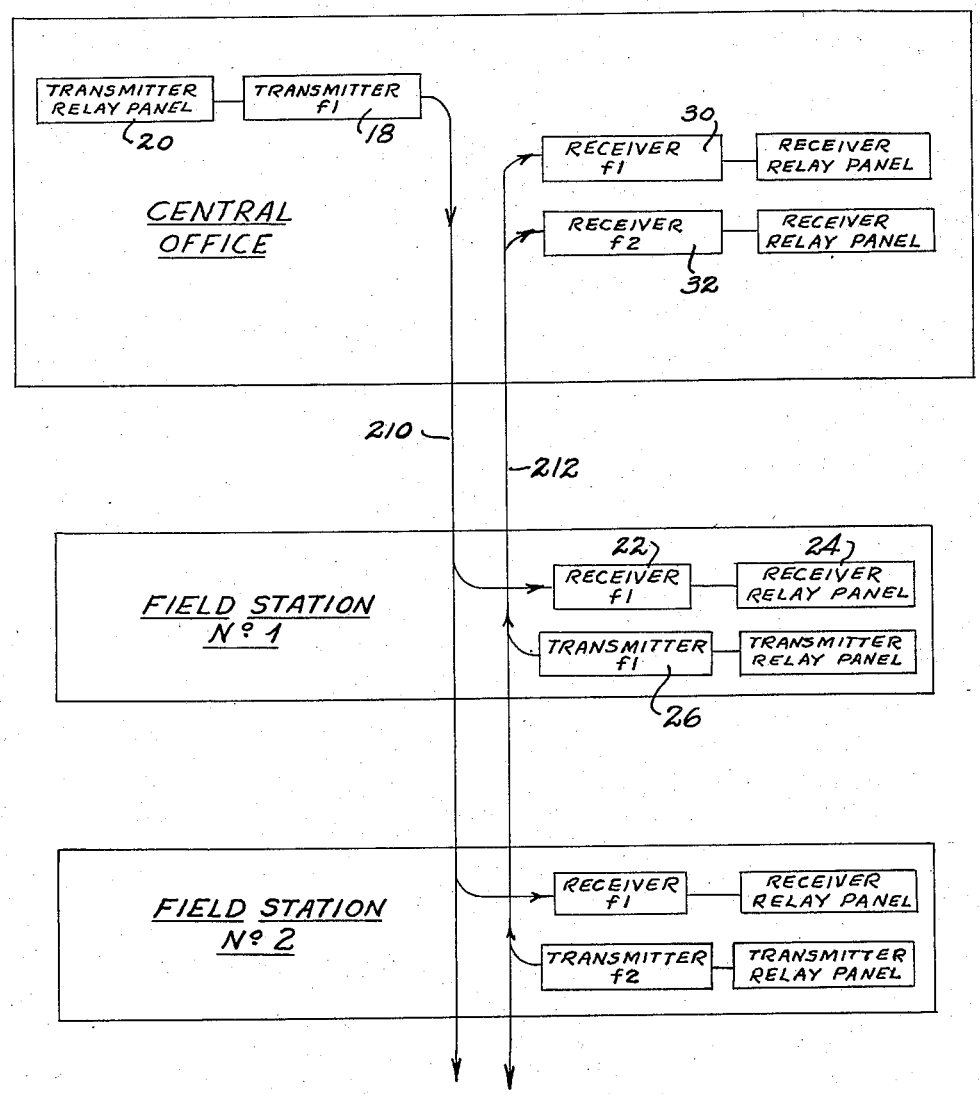
Figure 9:
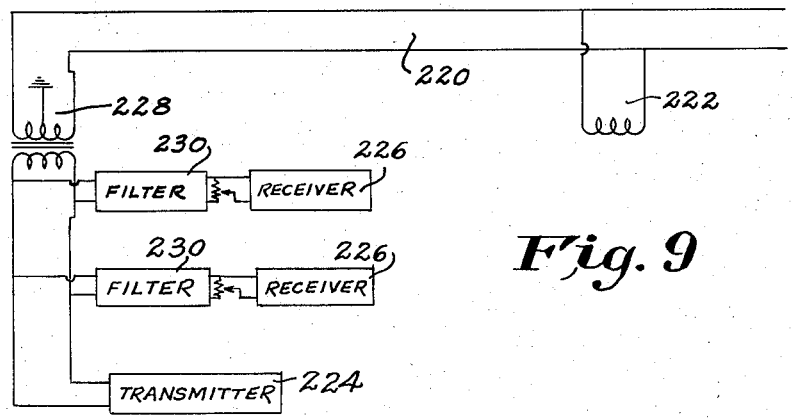
Figure 10:
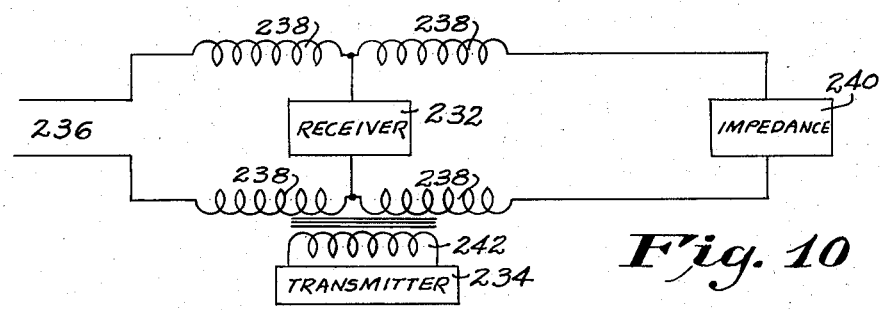

Fig. 4 is a view similar to Fig. 2 but showing the modifications of the relay panel to accommodate it to the purposes of one of the field station transmitter relay panels, for answer-back operation, Fig. 5 is a view similar to Fig. 3 showing the arrangement of one of the receiver relay panels at the central control office, for receiving and acting upon the answer-back information supplied from the remote field station, Fig. 6 is a block diagram, similar to Fig. 1, of a modified system of the frequency-shift type in which the transmitters at both the central station and the field stations employ two distinct, slightly separated carrier frequencies, instead of a single carrier frequency each, Fig. 7 is a similar diagram of a modified system in which the transmitters employ three distinct frequencies, Fig. 8 is a similar showing of a system using two separate communication channels, such as two complete two-wire circuits, between the central station and the field stations, one circuit being employed for transmission in one direction and the other for transmission in the other direction, Fig. 9 is a schematic diagram illustrating one manner of connecting the central station receivers to the communication line to ensure proper level or signal strength at such receivers, and to minimize the loading effect on the central transmitter, of the receivers so connected to the same line, Fig. 10 is a schematic view of a way of connecting field stations to the line to prevent the local transmitter from energizing the contiguous receiver and employing a hybrid arrangement to this end.

Figure 11:
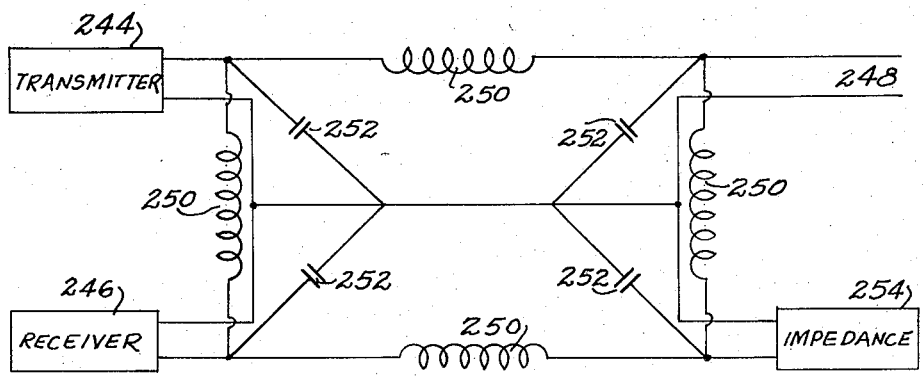
Figure 12:
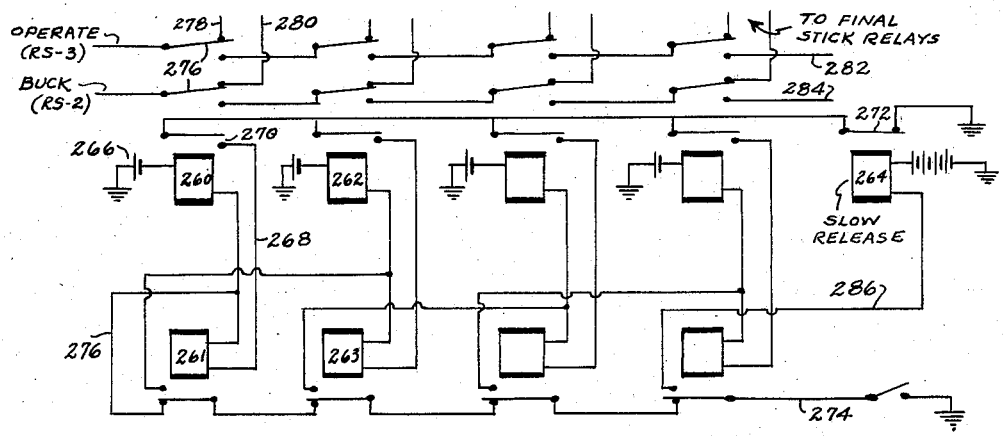

Fig. 11 is a view similar to Fig. 10 but showing the use of a directional-coupler arrangement between the line and a representative field station, Fig. 12 is a schematic view or circuit diagram of an alternative form of counting device, employing a ring relay arrangement, usable in place of the stepping switches in the form of the invention of Figs. 1 to 5, and Fig. 13 is a schematic view of a modified form of time-delay circuit utilizing a cold-cathode discharge tube in place of the system of Figs. 2 and 4.

In general, the improved system of the present invention encompasses a transmitter installation at the central control office, operating on a single transmitted wave frequency and transmitting this frequency in the form of pulses to a single line or channel, which will for example be associated with a railroad line or system. The pulsed signal from the control office is received at each of the remote field stations associated with the system, and certain of the equipment, namely the station-selecting equipment, at all field stations, responds to the initial pulses of each transmitted series of pulses. The nature of these initial pulses determines which of the field stations is then further activated to carry out a control function designated by later pulses of the same series of pulses. In this way, a single line or a single carrier or wave frequency is capable of controlling desired functions at any selected one of the field stations, with consequent savings in time as well as in the bandwidth of the signalling channel required.

For answer-back operation, each field station is equipped with an individual electric energy or wave transmitter tuned to a particular frequency which is different from those of other field stations. To receive the answer-back information at the control office, the latter is provided with a plurality of individual receivers tuned to the respective frequencies of the field stations, and of course each receiver and each transmitter is associated with a relay panel which receives the pulse information and carries out the orders corresponding thereto, or converts the station selection or control information into appropriately significant pulses for controlling the associated transmitter.

Referring now specifically to the block diagram of Fig. 1, there is illustrated a system in accordance with the invention, comprising a central control office 10 and two representative field stations 12 and 14, which are disposed at a distance from the control office and connected thereto by a wire line or other communication channel designated by numeral 16. It is to be understood that the number of field stations is not limited to two, and that the number is to be chosen in accordance with the system requirements.

The central office 10 has associated therewith a transmitter 18, which may for example be a radio frequency oscillator having, as indicated, a carrier frequency of 200 kilocycles per second. The output of this transmitter to the line 16 is controlled by equipment 20 designated by the transmitter relay panel. The particular nature of the transmitter 18 is itself not a part of the present invention, and its construction is well known to those skilled in the art of radio communication. The pulsed signal output from transmitter 18 is applied to line 16 whence it is carried to all of the field stations associated with the system. At each of these field stations the signal is received by a receiver 22 tuned to the frequency transmitted by transmitter 18; in the example chosen, 200 kc. The receiver 22 at each field station is connected to control a receiver relay panel 24 which accomplishes both station selection (in a manner to be described), and the control of a function such as a change in position of a track switch, semaphore or other equipment. The receiver 22, like transmitter 18, are of conventional construction and need not be described in detail.

For answer-back operation, each field station (such as stations 12 and 14) is equipped with a transmitter such as indicated at 26 and 28, generally similar to the transmitter 18; but in the case of the field stations each transmitter is tuned to a frequency different from that of transmitter 18, and different from each other. As indicated in Fig. 1, the frequency of transmitter 26 associated with field station 12 may be 210 kc., and that associated with field station 14 may be 220 kc., and so on. These transmitters may thus all be connected to line or channel 16 without interfering with one another or with information going out from the central office transmitter 18. The information put on line 16 by these respective field station transmitters is received at the central control office 10 by respective receivers 30, 32 et cetera, there being such a receiver for each field station of the system. Associated with each transmitter 26, 28, at the field stations is a transmitter relay panel such as 34, 36 in the two field stations shown, and at the central office 10, each receiver 30, 32 has connected thereto a receiver relay panel such as 38, 40 and so on.

Before proceeding with the detailed description of the circuitry by which the system is controlled, a brief reference to the type of signal pulses employed will be given. Basically, the present system is operated by the transmission of a standard series of pulses for each operation initiated; the series comprises pulses each formed of a mark (carrier "on") period and a space (carrier "off") period. The total number of complete pulses in a series of a particular unit is always the same, the pulses being obtained by successive steps of a rotary stepping switch or other counting device. Normally the pulses are formed by equal lengths of mark and space periods, and this normal characteristic is altered, as to chosen pulses in a series, by extending the length of the space periods of such chosen pulses, for example so that the space period is twice the length of the mark period. Obviously, the alteration in length could equally well be made to apply to the mark period rather than to the space period, and the relative lengths of mark and space periods for either normal or altered pulses can be varied as desired in different installations.

The stepping speed of the stepping switch (or other counting device) controlling the transmitter oscillator is controlled by a slow-acting relay in control of its stepping magnet and itself energized by contacts made and broken by said stepping magnet, so that an oscillating type of operation is obtained; the repetition rate and relatively equal lengths of mark and space of pulses in a series is normally controlled by the time constants of the relay and the magnet of the stepping switch. To produce a pulse whose space period is lengthened, spoken of herein as an altered pulse, it is merely necessary to extend the effective time constant of the relay. While this may be done in various ways, a particularly simple and dependable arrangement in accordance with the present invention is to provide an additional relay, also slow-acting, and to connect this latter relay in cascade with the first-mentioned relay at times corresponding to the positions of the pulses to be altered in a series. The delays of the two relays are then additive, and produce the desired extension of the space portion of the pulse. Conveniently, the control for rendering the additional relay effective is obtained by energizing it from contacts forming one bank or level of the stepping switch which produces the pulse series, so that by applying voltage to selected contacts of that bank, the additional relay will be rendered effective automatically at the proper times, to alter the desired pulses of the series being transmitted.

As has been intimated, the earlier pulses of any one series emitted by the central office are used to select the desired field station to which control is to be extended, and the later pulses of the same series are utilized to exercise the desired control function at that field station. By this system, the same equipment can be used for station selection and control function selection, and a minimum amount of such equipment is required. What this amounts to is the treating of station selection as a kind of control function in itself, the function in this case being the energization of a part of the field station apparatus so as to make use of the later pulses to be received. Thus, all field station receivers receive the pulses of each series, and certain of the relay equipment at each field station responds to all the pulse series. This certain part of such relay equipment determines, on the basis of the receipt of normal and altered pulses in the early portion of a series, whether the signal is in fact directed to its own station, and if so, it completes a circuit so that pulses received thereafter (mediately or, as the case may be, immediately), will energize function-controlling relays at that station.

Referring now to Fig. 2 of the drawings, there is shown the apparatus corresponding to the transmitter relay panel 20 of Fig. 1. This equipment comprises a multi-level or multi-bank stepping switch of the rotary type, designated by SS (and having switch banks or levels S-1, S-2 and S-3), whose wipers are stepped in the usual way to engage successively the contacts of respective banks, as by a stepping magnet TSS. A conventional ratchet wheel and pawl arrangement is linked to the armature of magnet TSS, and the operation is such that upon energization of magnet TSS, the pawl is lifted against the tension of a spring, and when the magnet is de-energized, the pawl engages the ratchet wheel and advances the wiper shaft and wipers through such an angle as to move the wiper contact end from one bank contact to the next. This construction is conventional and further illustration thereof is deemed unnecessary.

Contacts $a$, also operated by the armature of magnet TSS, are connected to a voltage source and to the cathode (or other control electrode) of a conventional 200 kc. oscillator designated by numeral 36 and forming a part of the transmitter 18 connected to line 16, so that upon each step of switch SS, a short emission of the 200 kc. energy to the line results, followed by a dwell or space period when magnet TSS is de-energized. A keying filter comprising a pair of radio frequency chokes, a condenser, and an audio choke are included in the line controlling oscillator 36. The wipers of level S-1 are of the bridging type, for a purpose to be explained, while the wipers of level S-3 are of the non-bridging type; that is, the latter wipers are not broad enough to touch two successive bank contacts at once.

Counting clock-wise around the bank contacts of level S-3, the first contact is unused, and the next few contacts are connected through switches or keys 38 (which may be manually operated) to a source of potential, such as the positive side of a battery (not shown, but indicated by the incoming arrowhead 40), these keys corresponding in number to the number of field stations to be controlled by the central office, and serving, in a manner to be explained, to provide an altered pulse (one with a lengthened space period, for example) selectively at the second, third, fourth or later position of the wiper S-3. After the wiper of level S-3 has passed over all of the station-selecting contacts, it proceeds to engage, in turn, the contacts such as 42, 44 and so on. These pairs of contacts are connected to opposite contacts of a series of three-position keys 46. Each key 46 corresponds to a particular multi-position device at the selected field station, such as an electromagnetic track switch operator having "normal" and "reversed" conditions to be selected and controlled. Thus, since the common contacts of keys 46 are also connected to the positive battery supply, operation of one or more keys either upward or downward will apply a positive potential to the wiper of level S-1 at the corresponding contact position on the bank of contacts, and will produce a lengthened pulse space period in a manner to be described.

The initiation of a control cycle at the central office is accomplished by manually depressing the start button 48, which connects the positive pole of the battery supply to the coil of relay SSR through contacts $b$ of relay CDR, and SSR operates to close its contacts $c$ and thereby apply battery to relay CDR and (via lead 50 and contacts $d$ of TSS and contacts $e$ of relay CR) to the relay PGR whose coil has connected thereto a delay circuit comprising a combination of resistors 52, 54 and condenser 56. After a predetermined delay interval, contacts $f$ of PGR are closed, and connect the positive potential supply to magnet TSS via lead 58. This not only raises the operating pawl of the wipers of the stepping switch in preparation for an advancing movement of said wipers, but also opens contacts $d$ of TSS to interrupt the supply of voltage to relay PGR, which thereupon de-energizes and opens its contacts $f$ to de-energize magnet TSS and allow the wipers to advance one step. Since the de-energization of magnet TSS again closes its contacts $d$, this cycle is repeated and produces a series of pulses from transmitter 18 to line 16 by virtue of the successive opening and closing of contacts $a$ of TSS. The circuit is so arranged that the mark and space periods are of approximately equal length under normal conditions in which no key 38 or 46 is closed.

To produce a lengthened space period in any one of the earlier pulses in a series, and thereby to select the desired field station, one of the keys 38 is closed, and when the wiper of bank S-3 reaches the bank contact connected to such key, positive potential will be applied from source 40 via lead 60 to relay CR, and its front contacts $e$ will operate to disconnect the voltage supply to relay PGR and apply it through a timing resistor 62 to relay CPR, which is a slow-operating relay. After a slight delay, relay CPR will close its contacts $g$ and complete the voltage supply circuit to relay PGR so that after a further additional delay due to the time constant of the latter relay, its contacts $f$ will close as before to continue the cycle. In this way, operation of a key 38 has caused an extension of the space period of the appropriate pulse of the series being transmitted to line 16.

Once the start button 48 has been operated to initiate a cycle of operation, it may be released, because the first advancing movement of wiper S-1 completes a lock-up or stick circuit for relay SSR via the connected (strapped) terminals of bank S-1 (only the home terminal connected to lead 64 being omitted from this strapping), and thence via lead 66 and contacts $h$ of relay SSR to its operating coil.

As will be described below, the stepping switch at each field station will be operating in synchronism with the stepping switch just described; in the event of loss of synchronism, it is desirable to prevent the initiation of another control cycle at the central office until the wipers at the field station have restored themselves to their home positions. To this end, relay CDR is provided, energized from contacts $c$ of SSR as above described and provided with a very long release time as by the timing circuit 68. The time delay required for this relay to release after the wiper of level S-1 has reached the home contact connected to lead 64, will prevent the initiation of another control cycle until the stepping switch at the remote station has had time to reach its home position also.

The manner in which a coded series of pulses, containing information both as to the desired field station, and the desired control function or functions to be performed there, is applied to line 16, has now been described. Turning to Fig. 3 of the drawings, there are shown in schematic form the essential components for receiving this information at a field station, such as field station 12 of Fig. 1. In Fig. 3, the radio frequency carrier receiver is again denoted by numeral 22, and is of conventional construction and so arranged as to apply voltage to the coil of receiving relay RR. A condenser such as shown, connected across the coil of this relay may be used as a filter for such relay.

When the mark portion of the first pulse of a series energizes relay RR, a positive potential as from a 12-volt source 70 is applied through contacts $h$ of relay RR to stepping magnet RSS of the receiver stepping switch, which is similar to that described in connection with the transmitter, and when the space period of the pulse occurs, relay RR is de-energized and so is magnet RSS, advancing the wipers RS-1, 2 and 3 to their respective second bank contacts. The second contact on banks 2 and 3 is unused, but wiper RS-1 now engages the strapped contacts of its bank. Positive potential from source 72 is applied through the wiper RS-1 to relay LPR, which remains energized until after completion of the last pulse by reason of strapping between the contacts of bank RS-1, the wiper being of the bridging type. Since contacts $j$ of LPR are maintained closed, positive voltage is applied via contacts $k$ of relay RR (when the latter relay is de-energized) to relay TR, which is slow to operate and hence picks up only on long pauses in the signal, and not on occurrence of the normal space periods of an unaltered pulse. When an altered pulse occurs, relay TR is energized, and a circuit is completed from a 12-volt source 74 through contacts $m$ of TR, thence to relay FSR which operates and by closure of its contacts $n$ puts 12 volts on the wiper of bank contact level RS-3, which of course now occupies a position depending upon the number of pulses which have been received. This potential is carried over the corresponding bank contact to the appropriate relay of the set of final operating relays R1, R2, and so on up to relay R11. Each of these final relays is equipped with a stick circuit through a normally open pair of its own contacts, as at 76 on relay R1, and will remain operated until a bucking winding on said relay is energized to overcome the flux due to the main winding. The bucking voltage is applied between a lead 78 and the common terminal (center) of the relay, the other terminal leading to the main winding. The bucking-out lead is connected through normally open contacts on each relay, as indicated at 80 on relay R1, and thence to corresponding contacts on the second level of bank contacts RS-2 of the stepping switch. Thus, if one of the final relays is in energized condition, and the dwell or space period of the corresponding pulse is of normal (unaltered) length, then a circuit will be completed from source 70, contacts $h'$ of relay RR (which is now energized by the mark portion of the succeeding pulse), contacts $p$ of STPR and contacts $n$ of relay FSR (sufficiently slow-operating to have remained released) to lead 82, wiper of RS-2 and to the buck-out winding of the appropriate final relay.

The relay EHR in Fig. 3 is designed to have a pick-up time which is longer than any intended dwell or length of space portion of the pulses. If the stepping switch at the receiver station gets out of synchronism with that at the transmitter, and if the receiver stepping switch is ahead, the strapping on bank level RS-1 will cause RSS ultimately to stop at its home position. The extra received pulses will drive the wipers past their home position at the conclusion of the series of pulses, LPR will be energized (independently of relay RR which will now be unoperated), and through contacts $q$ of LPR 12 volts will be applied to contacts $r$ of EHR to the self-interrupting contacts $s$ of magnet RSS to drive the wipers again to home position. Relay EHR is held operated while this is occurring, because of the fact that it is energized from contacts $t$ of relay TR, which is energized by reason of the de-energization of relay RR and closure of its normally closed contacts $k$. Any unusual halt in the progression of the wipers, such as will result if the receiver stepping switch is behind the transmitter stepping switch, will energize both relays LPR and EHR, and initiate this automatic homing feature.

*Field station selection*

The manner in which the occurrence of an altered pulse in the early portion of a series of pulses accomplishes station selection will now be described in connection with Fig. 3. That one of the final relays R1, R2 and so on which corresponds to the particular field station (e.g., the first relay R1 at field station No. 1, R2 at field station No. 2, and so on) is used to condition the equipment for responding to the signals of the later pulses of the series. Thus, if it be considered that Fig. 3 illustrates the equipment at field station No. 1 of Fig. 1, the relay R1 is so employed at this station. Each of the first few relays of this set (corresponding in number to the number of field stations) is provided with a pair of auxiliary contacts such as $v$, $w$, et cetera. If an altered pulse is received as the second pulse at the beginning of the series (the first pulse is suppressed in any event, so that the second advance of the wiper RS-3 corresponds to relay R1), relay R1 would open contact $v$ of the series chain of contacts $v$, $w$ and so on. If, however, the second pulse is an unaltered pulse and the fourth pulse is altered, relay R1 will be de-energized and relay R2 will be energized, as already described, and contact $v$ will remain closed and the make contact $w$ of relay R2 will be closed. Upon closure of the make contact $w$, a conductor 84 will conduct the 12 volt potential from source 86 to relay STPR, which will operate to interrupt the further operation of relays R3, R4, et cetera, following relay R2 (by breaking the circuit through contacts $n$ to the wiper RS-3), and will also prevent the bucking out of any of these later relays which were previously operated. Since relay R1 sticks in operated condition until bucked out by receipt of a later pulse series, this ensures that the equipments controlled by the relays R3, R4 and following final relays will not be disturbed by any of the later pulses of a series unless the station-selecting pulses have selected the relay (R1 in the example) signifying that the later control pulses are intended to control equipment at the first field station. Also, of course, the control pulses are prevented from operating any equipment at any other station which has not been selected in the manner described.

A lead 83 from the home contact of RS-1 bucks out relay R2 (and any other station-selecting relays pertaining to codes for non-selected stations) at the end of the cycle.

A connection 92 from contacts $h$ of relay RR leads to contacts $y$ of relay FSR and thence to its operating coil. This ensures that relay FSR, once it has been operated by the slow-to-operate relay TR, will remain energized (even though relay TR releases rapidly at the end of the long space period of a pulse) throughout the next mark period, during which relay RR is operated. This provides ample time for the relays connected to bank RS-3 to perform their functions.

It will be seen from the above that relays RR, LPR, TR and FSR are operated during each series of pulses on the line, regardless of the station desired to be selected. However, relay STPR is also operated in the event that the station selecting pulse corresponding to this particular field station is not an altered pulse, but is not operated when an altered pulse occurs in the proper position (in the series) so as to select this station. Since the current for energizing or bucking down the remaining (function control) relays is obtained from contacts $n$ of FSR and therefore from contacts $p$ of STPR, non-operation of STPR permits control of the later relays R3, R4 and so on when the desired station has been selected. As has been pointed out, as many of relays R1, R2 et cetera are devoted to station selection as there are field stations in the system, and the remaining of such relays are available for equipment control functions. Relays R3 to R11, inclusive, are shown in Fig. 3 as connected by their contacts z for track switch, semaphore or like equipment control over lines 88.

*Answer-back operation*

As was indicated above, the system of this invention provides for the return to the central control office of an indication of the condition of the various pieces of controlled equipment, and that this information is transmitted whenever a change occurs, from any cause, in the condition of any such equipment. To this end, and referring back to the block diagram of Fig. 1, a transmitter is provided at each field station, which transmits on a separate carrier the pulse information corresponding to each piece of equipment at that station. Fig. 4 of the drawings shows schematically the arrangement of parts for this apparatus at one of the field stations, specifically that at field station No. 1 of Fig. 1.

Referring now to Fig. 4 of the drawings, the field station transmitter is again designated by numeral 26, and its output is connected to the line 16 leading back to the central control office. The construction of the transmitter is well understood in the art, and need not be further described. The transmitter relay panel again contains a stepping switch identical with that used at the central office, and having levels S-1 to S-3 and the operating magnet TSS. Most of the components of this transmitter relay panel are identical with those contained in the central office transmitter panel of Fig. 2 and function in the same way. Therefore, for simplicity of description, the functions of such parts will not be repeated in detail except insofar as they are different from those already described. Similar reference numerals have been used for parts constructed and arranged in the same manner as in Fig. 2.

The principal differences between the transmitter control at the field station and at the central office are (a) the field station does not require a manual start button, but instead employs a circuit which initiates a pulse series upon the occurrence of any change in the condition of any unit of equipment controlled at that field station, and (b) the field station has no manually operated keys such as the station-selecting and function-selecting keys 38 and 46 of the central office transmitting equipment of Fig. 2. In place of these, the field station controls the nature of its transmitted pulse series from contacts associated with the various controlled equipments and indicative of their conditions of operation.

With the above distinctions in mind, it will be seen that Fig. 4 includes a set of relays CR, CPR, PGR, CDR and SSR just as in the case of Fig. 2. These are connected to one another and to suitable voltage sources in just the manner of Fig. 2, and will operate, after initiation of a pulse series, to transmit the normal and altered pulses indicative of the condition of the various equipments. However, to initiate such a cycle, an additional relay SR is employed in place of the start button 48. Inasmuch as this relay SR is almost always in its operated (energized) condition, it is so shown in Fig. 4.

Numeral 100 designates in diagrammatic fashion one typical piece of the kind of equipment under the control of the field station, and may be thought of as a solenoid operator for shifting a track switch from one of its two positions to the other. A similar solenoid would be used to shift the switch back to its original condition. With each such piece of equipment there is associated a pair of contacts 102 arranged to connect a voltage source 104 to one of the bank contacts 106 of level S-3 when the operator is in its operated condition; another pair of contacts, not shown, would connect a different point (usually, an adjacent point) of level S-3 with the voltage source in the other condition of the operator 100. Also connected to the device operated by the operator 100 and as indicated by a dashed line, is a moving contact 108 which, in either condition of the equipment, contacts one or the other of a pair of contacts 110, 112. These sets of contacts are connected in a series chain between a voltage source and the lead 114 which leads to a pair of contacts 116 of relay SR and thence to its coil and to the opposite side of the voltage source. Clearly, any movement of the piece of controlled equipment controlled by operator 100 will shift the movable contact 108, and thereby momentarily interrupt the current to relay SR. When this happens (and assuming the stepping switch is at its home position as shown), relay SR will be de-energized and its contacts 118 will close, applying voltage from source 120 and contacts b of relay CDR to relay SSR, whose contacts c will complete a circuit via contacts d of stepping switch magnet TSS, contacts e of relay CR and to relay PGR, which will energize the magnet TSS and open contacts d thereof to produce a pulsing series. In this way, the initiation of a pulse series results from any change whatever in the controlled equipment, whether initiated remotely from the central station, or locally as by physical movement of a switch or the like.

During the cycle of movement of the stepping switch so initiated, wiper S-3 will advance periodically as in the case of the central station stepping switch, and transmitter 26 will be pulsed by contacts a of TSS to emit bursts of carrier energy (in the case of this field station, at 210 kc.) to the line 16. The space periods of these pulses will be of normal length (about equal to the mark periods) as determined by the time contact of relay PGR. When the wiper S-3 contacts any of its bank contacts such as contact 106 upon which a positive potential exists due to the closure of any of the condition-indicating contacts 102 of the operator 100 or others, a circuit is completed from voltage source 104 through the wiper and to relay CR, which picks up and inserts relay CPR in cascade with relay PGR, producing an additional delay in the termination of the space period, and hence an "altered" pulse, just as in the case of the central station transmitter. Upon receipt of the pulse series at the receiver 30 (Fig. 1), the coded pulse series will be decoded by equipment to be described, and a suitable indication to the operator will be given on usual display equipment.

Fig. 4 also shows a relay EHR and associated circuits which are for the purpose of preventing the emission of an incomplete series of pulses from the field station in the event that battery or local power should fail at the field station. If this happened, the corresponding receiver at the central station would home automatically in a way which has been described, but the wipers at the field station transmitter might well stop part way through a series of pulses; then, upon resumption of battery supply, the field station transmitter would transmit the remaining pulses of the interrupted series, and the central control station receiver would receive incorrect information. To prevent this occurrence, and referring to Fig. 4, the EHR relay receives battery from source 120 and has a stick circuit through its own contacts 136, rectifier 140 and contacts b of CDR to normally closed contacts 142. When battery fails, with wiper S-1 off normal, relays SSR and EHR fall down, and the latter opens contacts 138 in series with the oscillator keying circuit. When battery restores, SSR picks up and initiates operation of CPR and PGR to drive wipers to home position, but relay EHR will not be re-energized until the wipers are at their home position, whereby emission of an incomplete series of pulses during the wiper-restoring phase is prevented.

Fig. 5 illustrates a preferred arrangement of the receiving relay panel associated with receiver 30 at the control station, this being the receiver tuned to the frequency of 210 kc. transmitted back from field station No. 1. It will be understood that there is an arrangement of such apparatus, located at the central control station, for each of the field stations, and suitable individual display lights or other indicators for continuously indicating the conditions reported back from the various field stations.

The receiving relay panel equipment shown in Fig. 5 includes a receiving relay RR similar to that of Fig. 3, connected to receiver 30. Indeed, the circuitry of Fig. 5 is identical with that of Fig. 3 except for the fact that there is no requirement for discrimination between station-selecting pulses since a separate frequency is assigned to each field station for answer-back purposes, and for the fact that the devices connected to level RS-3 of the stepping switch are relays which control suitable signals, not shown. Thus, when a pulse series is received at relay RR, voltage is first applied through its contacts $h$ to the stepping magnet RSS to prepare for advance of the wipers of levels RS-1 to RS-3. When the space period of the first pulse occurs, relay RR is de-energized and voltage is applied over its contacts $k$ to relay TR, which is again a slow-to-operate relay and pulls up only if the space period is longer than normal; that is, if the received pulse is an altered pulse. The first pulse is again unused except to step the wipers to their first off-normal position, which happens during the first space period due to the interruption of current contacts $h$ of relay RR and the magnet RSS. If the next received pulse has a normal space period, relay TR will not pick up and contacts $h'$ of relay RR, during the succeeding mark period, apply voltage over contact $n$ of relay FSR to the wiper RS-2. If the corresponding final relay R12, R13 and so on is in the operated condition from a previous transmission, it will be bucked down by current from wiper RS-2 and contacts such as 130 of relay R12. A stick circuit for each final relay is provided, just as in the case of Fig. 3.

If the second received pulse has a greater than normal space period (corresponding to an altered pulse), relay TR will pick up when contacts $k$ of relay RR close at the end of the preceding mark period, and contact $m$ of relay TR will direct current to relay FSR, which will operate and its contact $n$ will put potential on the wiper of level RS-3 to energize the corresponding relay R12, R13 and so on. The operated final relay will stick in the operated condition until bucked down as described earlier herein. Each final relay is provided with a set of contacts such as 132 leading to a signal light or other suitable indicator 134 to provide the operator with a continuous display of the condition of all equipment at the field station corresponding to receiver 30.

The functions of relays LPR and EHR are precisely as described for the same relays in the diagram of Fig. 3, and it is therefore believed that repetition of this description is unnecessary for a clear understanding of the circuit. The principal differences between the circuits of Figs. 3 and 5, of course, are the changes in the connections to level RS-3 to provide for output connections to indicator devices, and omission of the contacts required for station-discrimination, together with elimination of the relay STPR of Fig. 3 which is also appropriate only to the station-selecting function.

In the complete system which has been described so far, in connection with Figs. 1 to 5 inclusive, the central office transmitter operates with a fixed frequency carrier received by all of the field stations, with station selection accomplished by varying the duration of the carrier-on or carrier-off portion of particular pulses. Also, that system employs an individual different carrier frequency for answer-back operation. As has been stated, the nature of the signals transmitted in both directions may be varied, some of the variations being obvious to those skilled in the art.

Certain other variations of the kind of signal energy transmitted offer special and unobvious advantages, and some of these will now be described briefly by reference to block diagrams similar to Fig. 1, and employing for the most part major components like (or slightly modified from) the corresponding major components of the first system.

Fig. 6 illustrates such a modified system in which the signal put on the line connecting the central office with the field stations consists of an alternation of two different frequencies. For example, the signal going from the central office to all field stations may consist of alternate pulses of frequencies $f1$ and $f2$, which may for example be 100 kc. and 100.4 kc. The transmitter arrangements at the central office would include a transmitter relay panel 150 similar to that shown in Figs. 1 and 2 of the drawings, and connected to control a transmitter 152 through some modulating device 154 capable of causing the emitted frequency to change from 100 to 100.4 kc. and back. This signal is connected to the communication channel 156 and received at all the field stations, where selection of the proper field station may be effected by sensing which of the initial pulses of the series has a lengthened duration. The increased duration may apply to either of the two emitted frequencies.

Selection of the function to be performed at the selected field station will be accomplished in accordance with the duration of one of the frequencies making up a complete pulse, and occurring at a later point in the series of such pulses. The manner in which function selection is to be accomplished can be identical with that already described in accordance with Fig. 3. However, in order for each field station to be able to sense which of the pulses of a series are of lengthened duration, it will be necessary for the receiver such as 158 at each station to be capable of accepting pulses of both the transmitted frequencies, and to include a discriminator 160 which will control the receiver relay panel 162 so that the pulses produce synchronous stepping of the stepping or counting device.

In a system of the type just described, answer-back operation can easily be obtained by providing at the central office an individual receiver such as 164 corresponding to each field station, and by providing at each field station an individual answer-back transmitter 166, together with means for altering the transmitter frequency between two frequencies different from those employed from the central office transmitter to the field stations. Thus field station No. 1 may have a transmitter 166 capable of emitting two frequencies $f3$ and $f4$ in accordance with pulses initiated by the transmitter relay panel 168 at that field station. These pulses will return to the central office and be sensed only by the receiver 164 corresponding to field station No. 1, and are discriminated, prior to being used for control of the receiver relay panel and apparatus condition indicating equipment, as by a discriminator 170.

Other field stations will use identical equipment except that the respective transmitters will have their carriers shifted between still other values, such as $f5$, $f6$ at field station No. 2.

Fig. 7 illustrates a further modification of a control system including the use of three distinct frequencies for each combination of a transmitter and a receiver. As indicated in the drawing, the transmitter relay panel 172 in such a system will be provided with a two-position or alternate-contact device 174 and so controlled by the PGR relay (of Fig. 2 for example) that in one position it energizes transmitter 176 to emit a continuous series of equilength pulses having respective carrier frequencies $f1$ and $f2$, these pulses being emitted to the common communication channel 178. When a pulse is to be "varied in character," for example to accomplish station selection or function control, the transmitter control panel will cause device 174 to deenergize transmitter 176 and energize transmitter 180, and thereby to emit (in lieu of a pulse *f*1 or a pulse *f*2) a pulse of frequency *f*3. In other words, the normal cadence of pulses *f*1 and *f*2 will be momentarily interrupted by the substitution of a pulse *f*3. Since the presence or absence of the frequency *f*3 at any point in the series of pulses will be used to operate station selection and function control equipment, it is unnecessary in this system to provide any means for varying the duration of pulses, and all pulses of whatever frequency may have the same predetermined time duration. With respect to the selection of frequencies such as *f*1, *f*2 and *f*3, it is clear that all three frequencies can readily be obtained from a single transmitter by changes in the frequency-determining circuit thereof; thus, alternate tank circuits, crystals, reactants to controls and other well-known means may be used to accomplish generation of the desired frequencies, instead of the separate complete transmitters shown. Instead of cutting out one or the other of F1 or F2 and imposing a separate F3 in place of that omitted, it is possible also to secure a selecting pulse by superimposing another frequency on either F1 or F2.

In the system of Fig. 7 as described, each field station will be equipped with a receiver 182 capable of receiving frequencies *f*1, *f*2 and *f*3, and some two-position device (such as a relay) in receiver relay panel 184 which will be operated to one position so long as an undesired succession of pulses of frequencies *f*1 and *f*2 is received, and to a different position upon the occurrence of a pulse of frequency *f*3. Connections corresponding to these two positions can then be made to control a relay such as relay FSR in the receiver relay panel equipment of the type illustrated in Fig. 3. In this way, the selection of a final relay such as R1—R11 of Fig. 3 will be accomplished, and the corresponding relay either operated or bucked out in accordance with whether frequency *f*3 is or is not received in any position in the series of pulses.

Answer-back operation in the system shown in Fig. 7 will be obtained in a quite similar manner, by means of transmitters 186 and 188 at each field station capable of emitting a normal cadence of pulses of frequencies such as *f*4 and *f*5, different from *f*1 and *f*2, and a function-acomplishment indication (or the like), as a momentary substitution superimposition of a pulse of still a different frequency *f*6. Other field stations will be arranged in the same way, except that the selection of frequencies to be used will be such as not to conflict with any of those previously assigned. Such frequencies are indicated as *f*7, *f*8 and *f*9 at field station No. 2. While the answer-back operation in these alternative systems is indicated as conforming generally to the system employed for transmission, it is obvious that the forward or direct transmission can be selected in accordance with one of the systems described, and the answer-back arrangements in accordance with any other transmission system.

Fig. 8 illustrates an arrangement of apparatus in which one channel is used for conveying orders (including station selection orders) from the central office to the various field stations, and a separate channel is used to convey the answer-back signals from all of the field stations to the central office. The term "channel" as here used is meant to include either a physical pair of wires, two such pairs being needed for direct and answer-back operation to avoid possible cross-talk if a common conductor were used, and also to include distinct high-frequency propagation channels such as separate micro-wave channels.

As indicated in Fig. 8, the transmitter equipment 18, 20 at the central office may be identical with that shown in Figs. 1 and 2, and is connected to a circuit, micro-wave channel or the like indicated by numeral 210 which in turn leads to the receiver equipment 22, 24 at each field station. This receiver equipment, again, may be identical with that shown in the field station of Fig. 1, and elaborated in Fig. 3.

The separate physical circuit, micro-wave channel or the like 212 is provided for answer-back operation, and connects all of the individual transmitters of the respective field stations to all of the individual receivers such as 30, 32 at the central office. A separate frequency is employed at each field station transmitter such as 26, as in the case of Fig. 1, but since the communication channels are separate, it is clear that the frequency assigned to the central office transmitter (*f*1) may now be utilized as the answer-back frequency for one of the field stations.

A further advantage of the 4-wire system lies in the case of an installation where one central office and only one field station are to be used, in that a D.C. system may be substituted for the electronic equipment for transmission and answer-back.

The major advantage of using separate channels for outwardgoing control and for answer-back arises from the difference in level, at the central office, of the outgoing and incoming signals. In a single channel system the level of the outgoing signal at the central office is high, while the levels of all of the incoming signals (from the field stations) are likely to be rather low. Thus, there is considerable likelihood that some of the high-level outgoing frequency will leak into the receivers located at the central office and controlled from the field stations. By separating the outgoing and incoming channels, the high level outgoing signal is largely prevented from affecting any of the receivers at the central office. It is not so necessary to provide separate answer-back channels, since it may be presumed that all of the field stations are relatively remote from the central office, and therefore that the signal of no field station will be of sufficiently high level, upon its receipt at the central office, to affect adversely the operation of a receiver pertaining to a different field station.

In the foregoing, certain variants of the system of pulses and signals have been described, with their attendant advantages, but it is to be understood that various features of these can be combined in various ways without departing from the basic principles of the invention.

Figs. 9, 10 and 11 illustrate various arrangements which may be employed for the connection of the transmitters and/or receivers of the foregoing systems to the transmission line or channel, with a view to preventing interference and the bridging losses associated with the connection of a plurality of receivers or transmitters across the same line. Such bridging losses are encountered despite ordinary precautions such as the careful tuning of receivers and transmitters to their intended frequencies.

Fig. 9 shows a transmission line 220 having bridged thereon several field stations of the kind already described and one of which is represented by numeral 222. At the central office, where there is located a single transmitter 224 and a plurality of answer-back receivers such as 226, coupling to the line 220 may be accomplished by a conventional transformer 228 having one winding balanced between the conductors and ground, and its other winding multipled to the transmitter and the tuned receivers. Since the signal level generated at 224 would be applied directly to the answer-back receivers 226, false operation of the latter might result from this high signal level, even though the receivers are tuned to other frequencies expected to be received from field stations over line 220. Also, this leakage of signal to the receivers 226 represents a bridge loss with reference to the energy emitted by transmitter 224. To prevent this, a suitable channel filter 230 may be inserted between transmitter 224 and each of the receivers 226, these filters being designed to pass only energy received from corresponding field stations intended to operate the respective receivers. If the signal levels received at the central station from different field stations are of different values, suitable adjustable attenuators may be inserted between the unbalanced winding of transformer 228 and the respective receivers 226.

Fig. 10 illustrates an arrangement by which, at the field stations, the receiver 232 and the answer-back transmitter 234 may be coupled to the common line 236, without the local receiver 232 receiving any appreciable amount of energy from the answer-back transmitter 234. This is accomplished by a known type of hybrid transformer having balanced windings 238 across the midpoint of which the receiver 232 is connected, the outer terminals being connected respectively to the line 236 and to an equivalent balancing impedance 240. Transmitter 234 is coupled in a balanced manner to one set of windings 238 by a transmitter winding 242.

The principles of operation of this hybrid coil coupling system are well known, and need not further be described herein.

The principal advantage of such an arrangement is that it sets a lower limit to the effective energy, leaving the local transmitter and arriving at the local receiver, in terms of the available signal energy.

Fig. 11 shows schematically a further arrangement for preventing interaction between a local transmitter 244 and a local receiver 246, both connected in energy-transfer relation to the common line 248. This arrangement is of the kind known as a directional-coupler, and consists of a bridge configuration of inductances 250 and capacitors 252. The transmitter and receiver are connected to one set of pairs of conjugate terminals, and the other pairs are connected respectively to the line 248 and to a balancing impedance 254.

It being understood that signal energy will encounter a 90° phase shift in crossing any leg of this quadrangular arrangement, it is clear that the alternative paths between the transmitter and the receiver differ in phase by 270° minus 90°, or 180°, so that the signals between these two elements are always cancelled. This is true so long as the constants of the circuit are chosen to provide the said 90° phase shift at the transmitter frequency.

Fig. 12 illustrates schematically a counting device which is functionally the equivalent of the stepping switches shown in Figs. 2 to 5, but employing only simple relays in a so-called ring counter arrangement. This circuit comprises a plurality of pairs of relays 260—261, 262—263, and so on, and a release relay 264. The coils of the relays of each pair are connected in series with one another and with an operating current source such as 266, the circuit being completed as by a lead 268 through the normally open contact 270 of relay 260 and the normally closed contact 272 of relay 264. The series of pulses is first applied via lead 274 through the normally closed contacts of relays 261, 263, etc., and thence via lead 276 to the coil of relay 260. On receipt of the first pulse, relay 260 operates; when contacts 270 close, relay 261 is shorted, preventing its operation. When the pulse terminates relay 261 is no longer short-circuited, and now operates in series with relay 260. The next pulse closes a circuit from the normally open (now closed) contact of relay 261 to relay 262. In this way, the successive closures of pulse lead 274 cause successive operation of the relays 260, 262 and so on, whose contact sets 276 are connected to control the final stick and buck-out relays 278, 280 et cetera. The chains of normally open and normally closed contacts 282, 284 are marked to indicate that they correspond to the bank contacts of wiper levels RS-2 and RS-3 of Fig. 3. Upon receipt of the last pulse of a series (there are as many sets of relays 260, 261 et cetera as required for the number of pulses constituting the standard series), a circuit is completed over lead 286 to the release relay 264, which is slow-to-release, and whose operation de-energizes all of the previously operated relays.

In place of such ring counter relay arrangements, other electronic counters, cold-cathode ring counting circuits and the like could be employed, these arrangements being well known as equivalents to those skilled in the art.

Figure 13:
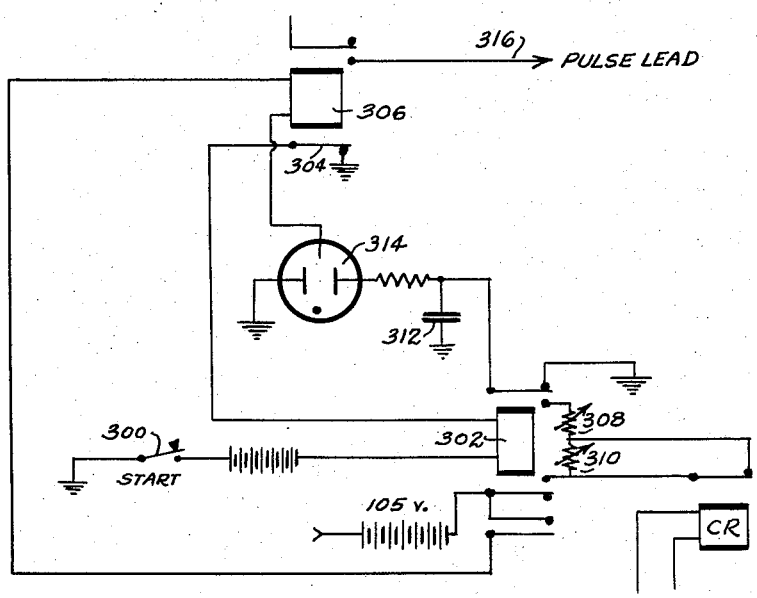

Fig. 13 illustrates the use of a timing circuit including a cold cathode discharge tube in place of the slow operating relays described in connection with Figs. 2 and 4 for obtaining a lengthened pulse portion at the desired point in a series of pulses. In this figure, the cold cathode tube is of the type in which discharge is initiated between two electrodes when a third electrode is raised to a sufficiently high positive potential. In Fig. 13, operation of the start switch 300 causes the energization of relay 302 through the normally closed back contacts 304 of relay 306. Both relays are slow to release. The operation of relay 302 accomplishes the following:

(a) Connects negative 105-volt battery to the winding of relay 306 establishing a preparatory path for its operation;

(b) Connects negative 105-volt battery through a variable resistance circuit consisting of resistances 308 and 310 to condenser 312. Condenser 312 charges at a rate determined by the resistances 308 and 310 until the charge voltage reaches approximately 70 volts, at which time cold cathode tube 314 will be ionized. Upon the ionization of tube 314 sufficient current flows to operate relay 306, whose operation accomplishes the following:

(a) Closes the pulse lead 316;

(b) Opens an operating circuit for relay 302.

When relay 302 releases, the tube 314 is deionized and relay 306 is released. It will be noted that the length of time which the pulse lead 316 is closed is determined by the sum of the release times of relays 302 and 306.

The interval between closures of the pulse lead is determined by the amount of resistance inserted by 308 and 310. Normally, resistance 310 is short-circuited by the normally closed contacts of a control relay CR so that the interval between pulses is determined by the time constant of $R308 \times C$. When relay CR is operated, the additional resistance 310 is inserted in series with 308 causing a prolongation of the interval time. By making 308 and 310 variable, it is possible to vary the normal interval of time and the prolonged interval times. The control relay CR, of course, represents the pulse-lengthening relay of Fig. 2 bearing the same designation.

In describing the invention, reference has been made to an "altered" pulse as being one in which a fixed-frequency carrier wave is "on" for a specified period and "off" for a longer specified period. Obviously, however, these conditions might easily be reversed, so that the length of the "carrier on" period is varied to produce the altered pulse. Also, the distinction between mark and space conditions might be varied in many other ways than by on-off or the carrier frequency shift systems disclosed; phase modulation of a continuous carrier is an example of such another system. Different audio tones on a single carrier could also be used.

In any of these types of systems, the change in length of the mark or space period relative to the other period of each pulse can be discriminated and used effectively by the equipment shown, or simple modifications thereof well within the ability of those skilled in the art. The invention, therefore, is not to be understood as limited to the details of the system shown by way of example, except as may be required by the scope of the appended claims.

What is claimed is:

1. A remote control system comprising a transmitting station, a plurality of receiving stations, a common communication channel connecting said transmitting station to all of said receiving stations, means at said transmitting station for applying to said channel a series of carrier wave pulses of energy, each pulse comprising a mark period and a space period of predetermined relative duration, control means at said transmitter for altering the relative duration of the mark and space periods of certain of said pulses, each of said receiving stations comprising means for receiving all of said pulses, a rotary switch controlled by said receiving means to rotate stepwise in synchronism with pulses in said channel, relay means controlled by said rotary switch at each respective receiving station responsive to reception of an altered pulse occurring at a respective predetermined position in said series for completing an energizing circuit at a selected receiving station only, a plurality of function control relays at each receiving station, and means under the control of said energizing circuit for energizing a selected one of said function control relays, at the selected receiving station, in response to reception of another altered pulse occurring at a predetermined later position in said series.

2. A remote control system comprising a transmitting station, a plurality of receiving stations, a common communication channel connecting said transmitting station to all of said receiving stations, means at said transmitting station for applying to said channel a series of pulses of radio-frequency energy of a fixed frequency, each pulse comprising a mark period and a space period, control means at said transmitter for altering the character of certain of said pulses, each of said receiving stations comprising means for receiving all of said pulses, a rotary switch controlled by said receiving means to rotate stepwise in synchronism with pulses in said channel, relay means controlled by said rotary switch at each receiving station responsive to reception of an altered pulse of said series for completing an energizing circuit at said receiving station, a plurality of function control relays at each receiving station, and means under the control of said energizing circuit for energizing a selected one of said function control relays in response to reception of another altered pulse of said series.

3. In a pulse operated remote control system, in combination, a single transmitter, a plurality of receivers and means establishing a single communication channel therebetween, automatically cycling means at said transmitter for applying to said communication channel a predetermined series of carrier wave pulses comprising earlier pulses and later pulses, means at said transmitter for altering the character of at least one of said earlier pulses and means at said transmitter for independently altering the character of at least one of said later pulses, relay means at each of said receivers for receiving all of the pulses of said series and responsive to the later pulses of said series for establishing operating control circuits to devices to be controlled, and means at each receiver uniquely responsive to alteration of one of the earlier pulses of said series for disabling said last-named means in accordance with the receipt of an altered pulse among the earlier pulses of said series, said last-defined means at each receiver being further uniquely responsive to alteration of a different one of said earlier pulses of said series for enabling the response of said relay means to the later pulses of said series.

4. A pulse operated remote control system in accordance with claim 3, in which said means for altering said pulses comprises a pair of relays connected in cascade and each having a predetermined operation time, means for selectively disabling one of said relays at predetermined times during the transmission of said pulses, and means controlled by the other of said relays for intermittently energizing said transmitter.

5. A remote-control system comprising a transmitting control station, a plurality of receiving field stations, a common communication channel connecting said stations, means at said transmitting station for applying to said channel a series of pulses of carrier-wave energy, each pulse comprising a mark period and a space period, control means at said transmitter for altering the character of certain of said pulses, each of said receiving field stations comprising means for receiving all said pulses, a stepping device at each receiving station controlled by said receiving means, relay means at each said receiving station responsive to each pulse of a received series of carrier-wave pulses for stepwise advancing said device in synchronism with said pulses, a plurality of two-position control devices, means responsive to the character of later of the pulses of said series for selectively operating said control devices, and decoding means uniquely responsive at each receiving station to the character of earlier of said pulses for disabling said last-defined means, said decoding means at each receiver being further uniquely responsive to a different character of earlier of said pulses for enabling response to the later pulses of said series.

6. A receiving station in accordance with claim 5, in which the means responsive to the character of earlier of said pulses comprises a slow-operating relay, and contacts on said relay in series with the voltage supply to said means for operating said control devices.

7. A receiving station in accordance with claim 5, a stick circuit for said slow-operating relay, and means for interrupting said stick circuit upon termination of said pulse series.

8. A control system according to claim 5, in which said pulses of carrier-wave energy are all of the same carrier frequency, and in which each of said receiving field stations includes an answer-back transmitter connected to said channel and operating on a unique carrier frequency other than said same carrier frequency, each said answer-back transmitter including pulse-coding means responsive to the operated condition of the control device of the associated field station.

9. A remote control and signalling system comprising a control station including a transmitter for emitting series of pulses, each series comprising a predetermined fixed number of pulses, and including means for varying the character of individual selected pulses of each series to effect a control operation, at least one field station connected to said transmitter, an answer-back transmitter at said field station for emitting an answer-back series of pulses comprising a predetermined fixed number of pulses, an answer-back receiver at said control station responsive to the answer-back series of pulses from said field station, a local operating current supply at each of said stations, a switching device at each of said stations controlling the corresponding transmitter to initiate the pulses of a series to be transmitted to the other station, said device operating from an initial condition through a predetermined cycle of operations and terminating at said initial condition, and means responsive to a resumption of operating power following an interruption of said current supply for operating said device to its terminal condition and for simultaneously disabling the corresponding transmitter to prevent emission of a partial series of pulses.

10. A remote control and signalling system comprising a control station including a transmitter for emitting series of pulses, each series comprising a predetermined fixed number of pulses, and including means for varying the character of individual selected pulses of each series to effect a control operation, a field station connected to said transmitter, an answer-back transmitter at said field station for emitting an answer-back series of pulses comprising a predetermined fixed number of pulses, an answer-back receiver at said control station responsive to the answer-back series of pulses from said field station, a local operating current supply at said field station, a switching device at said field station controlling the corresponding transmitter to initiate the pulses of a series to be transmitted to the control station, said device operating from an initial condition through a predetermined cycle of operation and terminating at said initial condition, and means responsive to a resumption of operating power following an interruption of said current supply for operating said device to its terminal condition and for simultaneously disabling the answer-back transmitter to prevent emission of a partial series of pulses.

References Cited in the file of this patent

UNITED STATES PATENTS

| | | |
|---|---|---|
| 1,702,423 | Wensley | Feb. 19, 1929 |
| 1,888,985 | Hershey | Nov. 29, 1932 |
| 1,995,272 | Brixner | Mar. 19, 1935 |
| 2,141,551 | Phinney | Dec. 27, 1938 |
| 2,197,130 | Lewis | Apr. 16, 1940 |
| 2,229,249 | Lewis | Jan. 21, 1941 |
| 2,272,613 | Phelps | Feb. 10, 1942 |
| 2,445,895 | Tyrell | July 27, 1948 |
| 2,584,739 | Rees et al. | Feb. 5, 1952 |
| 2,627,063 | Richards | Jan. 27, 1953 |
| 2,629,088 | Kendall | Feb. 17, 1953 |